United States Patent [19]

Girismen

[11] 4,059,843

[45] Nov. 22, 1977

[54] OVERLOAD AND GROUND FAULT PROTECTIVE DEVICE

[76] Inventor: Fahir Girismen, 372 Baldwin Road, Carlisle, Mass. 01741

[21] Appl. No.: 712,852

[22] Filed: Aug. 9, 1976

Related U.S. Application Data

[62] Division of Ser. No. 467,654, May 7, 1974, Pat. No. 3,974,492.

[51] Int. Cl.[2] .......... H02H 3/00

[52] U.S. Cl. .......... 361/93; 340/255; 307/326

[58] Field of Search .......... 361/93, 92, 170, 63, 361/114; 340/280, 253 R, 253 A, 253 B, 255, 256; 307/326, 327, 328, 125; 200/51.09; 315/120

[56] References Cited

U.S. PATENT DOCUMENTS

| | | | |
|---|---|---|---|
| 3,114,904 | 12/1963 | Sliman | 340/280 |
| 3,441,799 | 4/1969 | Delafrange et al. | 361/93 |

*Primary Examiner*—Robert K. Schaefer

*Assistant Examiner*—Morris Ginsburg

[57] ABSTRACT

An alarm system detects the electrical disconnection of electrical equipment such as an appliance which connects by a power plug to a power receptacle on an AC power line. The detection and alarm generating portion of this system is preferably located in a conventional AC power receptacle box and includes a power receptacle which accommodates a conventional power plug from the electrical equipment. When the detection and alarm system is active, a pair of switches is set upon insertion of the plug into the receptacle and, thereafter, if the plug is removed from the receptacle, the alarm is energized. In various embodiments of the invention, the alarm is also energized when any of the following events occur: 1. The power line from the plug to the electrical equipment is cut or is short circuited to ground. 2. The system in the receptacle box is mechanically disturbed. 3. AC power fails and the plug is removed from the receptacle or the power line from the plug to the electrical equipment is cut or short circuited to ground and/or the system in the box is mechanically disturbed.

2 Claims, 11 Drawing Figures

OVERLOAD AND GROUND FAULT PROTECTIVE DEVICE

This is a division of application Ser. No. 467,654, filed May 7, 1974, now U.S. Pat. No. 3,974,492 issued Aug. 10, 1976.

BACKGROUND OF THE INVENTION

This invention relates to security alarm systems which give an alarm when the power line of electrical equipment is disconnected and more particularly, to a power receptacle which accommodates the electrical equipment power line plug and which is equipped to provide an alarm signal in response to the occurance of certain conditions.

Heretofore, it has been proposed to provide a power receptacle into which a conventional power plug from electrical equipment can be inserted, with an alarm system which initiates an alarm signal when the power plug is disconnected from the receptacle. Some of these systems are used for security to provide an alarm when electrical apparatus such as a television set is unplugged in order to steal it. In some security alarm systems of this sort, a special line is provided from the location of the receptacle to a remote observer location where the observer is signalled when the electrical apparatus is unplugged. In other such systems, an alarm signal generated at the receptacle is transmitted over the AC power line to a remote location for signalling an observer.

In many of the prior systems, the plug from the electrical apparatus is not of conventional design and neither is the receptacle. Hence, only apparatus equipped with the special plug can be secured by the alarm system. Also, in some of the prior systems, a dummy plug can be inserted in the receptacle after removal of the plug from the apparatus, and upon insertion of the dummy plug, the alarm is turned off. In addition, many of these prior systems will either become inoperative or they will give a false alarm when the AC power at the receptacle is turned off. Furthermore, in these prior systems, the receptacle can be tampered with and made inoperative so that no alarm is given when the apparatus is unplugged from the receptacle. None of the prior systems provide an alarm when the power line from the plug to the electrical apparatus is cut or short circuited to ground, and so a thief need only cut that line and remove the apparatus without fear of setting off the alarm.

In a conventional AC power system, a short circuit to ground instantly draws a high current from the AC power. The conventional safeguard against this is a fuse or circuit breaker at the AC power junction box that disconnects power to all receptacles and electrical items on the AC power line that are energized through that fuse or circuit breaker. This protection would seem to be excessive. It should only be necessary to disconnect power to the receptacle load or electrical item that is short circuited.

SUMMARY OF THE INVENTION

In view of the limitations of the prior security alarm systems, some of which are described above, it is one of the first objects of the present invention to provide a power receptacle which accommodates the conventional power plug of an electrical appliance and also provide a detection and alarm system, all of which fits within a conventional wall receptacle box, so that by simply connecting the receptacle to the AC power line within the box the detection and alarm system is ready for operation.

It is a further object of the present invention in conjunction with the above to provide a terminal clip for attachment to a conventional receptacle, thereby adapting the conventional receptacle for use in the present invention.

It is another object to provide a power receptacle into which the power line plug of an electrical appliance is plugged to provide power to the appliance, that also provides an alarm when the appliance is unplugged from the receptacle.

It is another object to provide a power receptacle security alarm system wherein at least some of the above described disadvantages or limitations of prior systems are avoided.

It is another object to provide a power receptacle security alarm system wherein an alarm is given when the system is tampered with.

It is another object to provide a power receptacle security alarm system wherein power failure, without more, does not result in an alarm and/or power failure does not make the system inoperative.

It is another object to provide a power receptacle security alarm system wherein an alarm is produced when the power line from electrical apparatus which is plugged into the receptacle is short circuited, such as when that line is cut or grounded.

It is a further object to provide a security alarm system for detecting at each of a plurality of AC power receptacles that a power plug inserted into a receptacle has been removed and immediately producing an alarm signal which is transmitted over the same AC power wires to a remote location where the alarm can be observed and/or recorded.

In regard to short circuit protection of an AC power system, it is another object of the present invention to provide at a conventional AC power receptacle means for interrupting power to the receptacle terminals when an excessive current is conducted through the terminals to an appliance plugged into the receptacle.

It is another object regarding short circuit protection to provide AC voltage to the receptacle terminals into which the appliance plug is inserted only when the plug is inserted.

The various embodiments of the present invention for a security alarm include a power receptacle and detection and alarm circuits, all located within a conventional wall receptacle box to which AC power wires run. The power wires connect directly to the receptacle in a conventional manner so that when a conventional AC power plug is inserted into the receptacle, power is fed from the receptacle through the plug and the appliance power line to the appliance. In accordance with a particular feature of the present invention, a conductive piece added to a substantially conventional receptacle provides an additional electrical terminal (referred to herein as the third terminal or the detection terminal that is energized only when the plug is inserted fully into the receptacle. This alarm terminal completes a circuit which energizes a control for switches. One of the switches which is so controlled, connects power from the AC power wires to an alarm and another controlled switch completes the circuit energizing the control means. The conditions of these controlled switches is such that once the alarm terminal is energized, as when the plug is inserted in the receptacle, the control means is energized and so long as the control means is energized, the alarm is not energized. Thereafter, when the control means is de-energized, as when the plug is removed from the receptacle, the alarm is energized.

In preferred embodiments of this security alarm, a key switch is provided which can be turned on and off with a key by an operator to disarm the alarm before the plug is inserted in the receptacle and then after the plug is inserted in the receptacle, the operator turns the key switch to arm the system. Once the system is armed, and then the plug is removed from the receptacle or the line to the appliance is cut or shorted to ground, the alarm goes off and the alarm cannot be shut off again except by the operator manipulating the key switch. For example, once the alarm goes off, reinsertion of the plug into the receptacle or insertion of the dummy plug into the receptacle will not turn off the alarm; only operation of the key switch will turn off the alarm.

Another embodiment of the security alarm includes a time delay relay so that in case AC power from the power wires is interrupted very briefly and then comes back on again, the alarm will not be sounded. Hence, this improvement to the system prevents a false alarm due to power failure.

In other embodiments, a DC power source is provided so that the system remains fully armed and active even when AC power failures of any duration occur.

In all embodiments of the security alarm described herein, if the AC power wires are short circuited or grounded, as when the power line from the plug to the appliance is cut, current flow to the switch control means is very briefly interrupted. This interruption results in the controlled switches changing position and so even if the short circuit condition stops, current flow is not returned to the control means and so the switches remain in the changed position and one of these switches feeds power to the alarm.

An optional feature of any of the embodiments of the security alarm described herein is a novel short circuit protection means at the receptacle. This protection means consists of an additional switch in the hot AC power wire to the receptacle, controlled by the same control means that controls the other switches in the security alarm. The effect of this additional switch is that AC voltage is not provided to the receptacle hot terminal unless an appliance plug is inserted into the receptacle and if the appliance plug draws an excessive current (such as when the appliance or the power line to the appliance is cut), the switch opens and AC voltage is not provided to that receptacle. When this protection is implemented by the electrical equipment described herein or by solid state electrical components, AC power to the short circuit plugged into the receptacle is cut off before a central fuse or circuit breaker in the AC power system is actuated. Thus, short circuit protection for the AC power system is provided immediately at the location of the short circuit and does not cause AC power interruption to the whole system.

This optional short circuit protection at the receptacle is readily made a part of the security alarm. It can also be used and implemented independently of the security alarm.

Other objects, features and advantages of the present invention are more fully apparent from the following description of the various embodiments of the invention which represent the best known uses of the invention, taken in conjunction with the accompanying drawings.

DESCRIPTION OF EMBODIMENTS OF THE INVENTION

Figure 1:
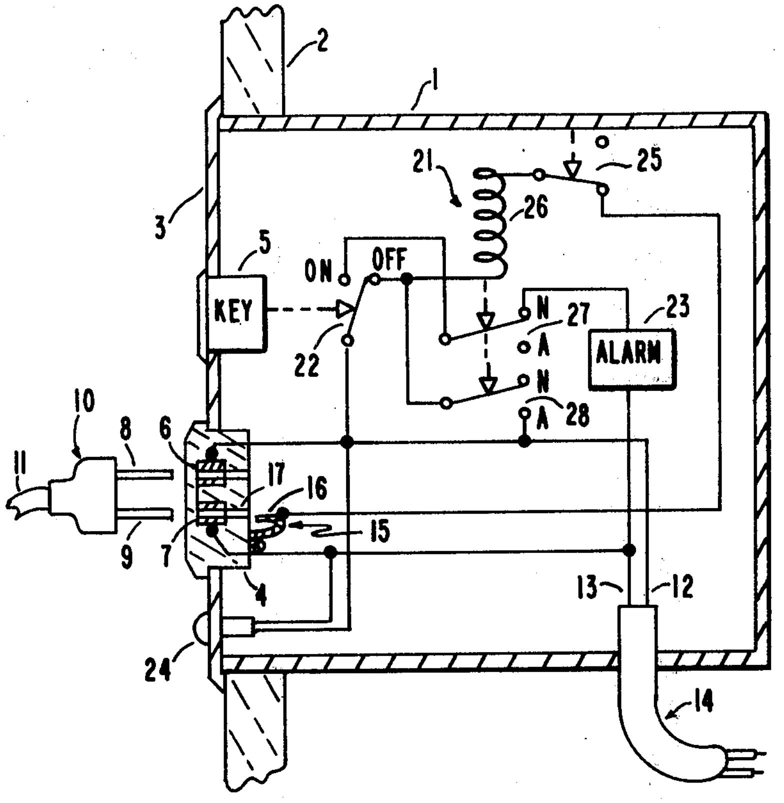
FIG. 1 is an electrical schematic diagram of the security alarm system incorporating the basic features of the present invention.

Turning first to FIG. 1, there is shown a representative mechanical and electrical schematic of an AC power receptacle security alarm system located in the conventional wall receptacle box. The receptacle box 1 is shown in outline mounted to the wall 2. A cover plate 3 which is substantially flush with the wall covers the opened end of the box and carries mounted thereon the receptacle 4, a key 5 and neon light 24. The receptacle 4 is an AC power receptacle and may be of substantially conventional design. It includes two contacts 6 and 7 into which are inserted the prongs 8 and 9, respectively, of a conventional AC power plug 10 at the end of the power line 11 of an appliance such as a television set or other electrical apparatus which is to be secured.

Figure 6:
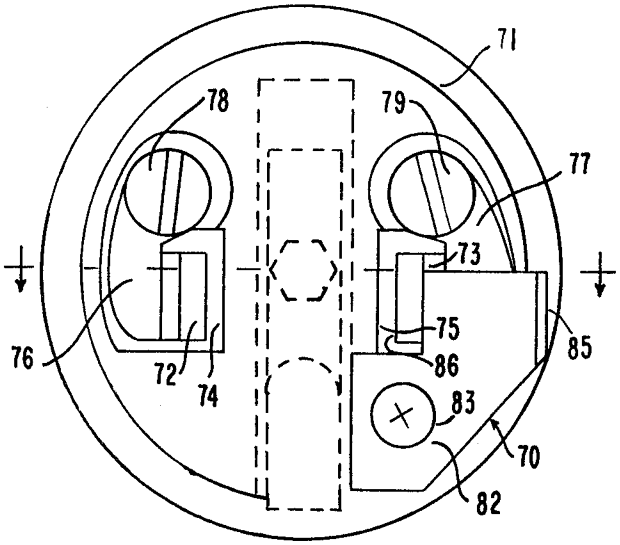
FIGS. 6 and 7 illustrate bottom and side views of a substantially conventional AC power receptacle equipped to provide the detection terminal, or third terminal, in the various embodiments of the present invention.

The contact terminals 6 and 7 in the receptacle connect to the hot and the common power wires 12 and 13, respectively, of the AC power line 14 that feeds AC power to the box. The connection of the power wires to the receptacle terminals may be accomplished with a conventional structure such as by screws which connect to the terminals as illustrated in FIG. 6.

At the bottom of the receptacle is provided a third terminal, also referred to herein as the detection terminal 15. This terminal is provided by a folded resilient conductive piece 16 that attaches to the bottom of the receptacle and is aligned with a hole 17 through the receptacle that aligns with the opening into terminal 7. Thus, when the prongs 8 and 9 of the plug 10 are inserted into the terminals 6 and 7, prong 9 extends through the hole 17 and contacts the detection terminal 15, it short circuits terminals 7 and 15. This circuit, of course, is open when the plug is removed from the receptacle. Details of the construction of the receptacle and terminal 15 are described herein with reference to FIGS. 6 to 11.

EMBODIMENT I

The circuit shown in FIG. 1 represents a relatively simple embodiment of the security alarm system of the present invention. This circuit is designed for operation with AC current only and consists of an AC double pole double throw relay 21, a single pole double throw key operated switch 22, and AC alarm unit 23, a neon light indicator 24 and microswitch 25. This electrical system is energized by AC power from the AC power line 14. More particularly, the common wire 13 in the AC power line is connected to terminal 7 of the receptacle and the hot or high voltage (117 volts AC) wire 12 of the AC power line connects to terminal 6 of the receptacle.

When the electrical system shown in FIG. 1 is connected as shown to the AC power wires, the neon light 24 is energized indicating that power is on. Next, the key 5 is manipulated by an operator to place the key switch 22 in the OFF position. Then the plug 10 of the appliance is inserted into the receptacle 4 so that AC power is provided to the appliance and the receptacle terminal 7 and detection terminal 15 are short circuited. The microswitch 25 is at all times closed and remains closed so long as this system is not tampered with. This is easily done by mounting the microswitch to the cover plate 3 at such a position that when the cover plate is attached to the wall box 1, the microswitch is held closed as indicated in the figure. Then if the cover plate 3 is removed, the microswitch will open de-energizing the relay 21.

When the electrical system is energized and the key switch is in the OFF position, the plug is inserted into the receptacle. This feeds current through the coil 26 of relay 21 causing the two ganged switches 27 and 28 of this relay to switch from their normal position, N, to their actuated position, A. Then the key 5 is manipulated by an operator with a key to turn the key switch 22 to the ON position. Relay switch 27 is in series with key switch 22 and feeds power to the alarm 23 when the key switch is in the ON position and relay switch 27 is in the N position. However, since the key switch is in the OFF position, no power is fed to the alarm even when relay switch 27 is in the N position. Then, when the plug is inserted into the receptacle energizing the coil 26, relay switch 27 moves to the A position and so the key switch 22 can then be set to the ON position without energizing the alarm. Furthermore, as soon as the coil 26 is energized, energizing current feeds coil 26 via relay switch 28 as well as through the key switch 22 and so at this point when the key switch is turned to the ON position, the coil continues to be energized. This use of relay switch 28 in conjunction with the relay coil 26 is sometimes referred to as self-latching.

After the plug is inserted in the receptacle, the key is manipulated by an operator to set the key switch 22 at the ON position and the system is then in operation.

If the plug 10 is later removed from the receptacle, the short circuit between receptacle terminal 7 and detection terminal 15 on the bottom of the receptacle is opened and current to coil 26 stops releasing both of the relay switches 27 and 28 to their N positions. When this occurs, current is fed through key switch 22 and relay switch 27 to the alarm 23, energizing the alarm. The alarm may be a noise generator which startles the person who pulled out the plug and alerts others to that fact, or the alarm may transmit signals to a remote location to alert an observer. The present invention can be used with just about any system for transmitting the alarm signal to the remote location. For example, a wired or a wireless transmission system may be provided for this purpose. Furthermore, the wired system may make use of the power line 14 for transmitting the alarm signal to the remote location.

If the plug is removed from the receptacle, as described, to set off the alarm, and then the plug (or a dummy plug) is immediately inserted into the receptacle to again short circuit the receptacle terminal 7 and detection terminal 15, the coil 26 will not be energized, because relay switch 28 will now be in the N position and so the alarm will not stop.

If instead of removing the plug from the receptacle, the power line 11 from the plug to the appliance is cut or momentarily grounded, this will very briefly short circuit the common and the high voltage AC power wires 12 and 13 and, during this short circuit, current flow through the relay coil 26 will stop, the relay switches 27 and 28 will return to their N positions and the alarm 23 will be energized. Thereafter, when the short circuit due to cutting the appliance line ceases, the relay switches 27 and 28 will remain in their N positions, the coil will not be energized and the alarm will continue.

EMBODIMENT II

Figure 2:
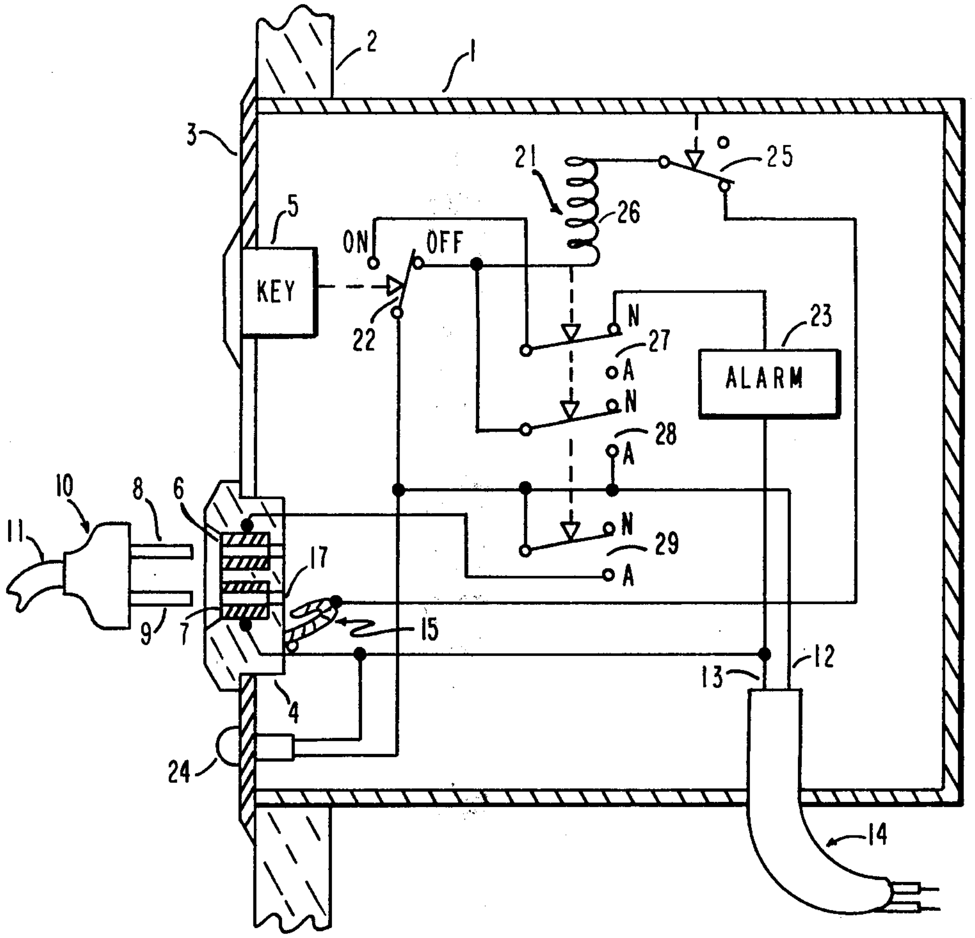
FIG. 2 is an electrical schematic showing the same security alarm system as in FIG. 1 which also includes the optional short circuit protection feature.

The optional short circuit protection feature is added to the system of FIG. 1 as shown in FIG. 2. This is simply and conveniently done by adding another single pole double throw switch 29 to relay 21. This switch 29, called the short circuit cut off switch is ganged with switches 27 and 28 and has two positions, the normal, N, and the actuated, A, positions. In the A position, switch 29 connects the AC hot wire 12 directly to terminal 6 of the receptacle. Thus, the receptacle is "hot" only when the relay coil 26 is energized and that can occur only when the plug is in the receptacle.

In operation when a plug is in the receptacle, the key switch is ON and a short circuit occurs in the appliance or the appliance power line 11, an immediate reduction of the AC current flow in the relay coil 26 results and the relay switches to the N position. When this occurs, the alarm is energized and power to the receptacle is interrupted by switch 29. Thus, the switch 29 functions as a ground fault interruptor, providing ground fault protection right at the receptacle, because relay coil 26 is de-energized instantly before the AC power system fuse or circuit breaker opens.

EMBODIMENT III

Figure 3:
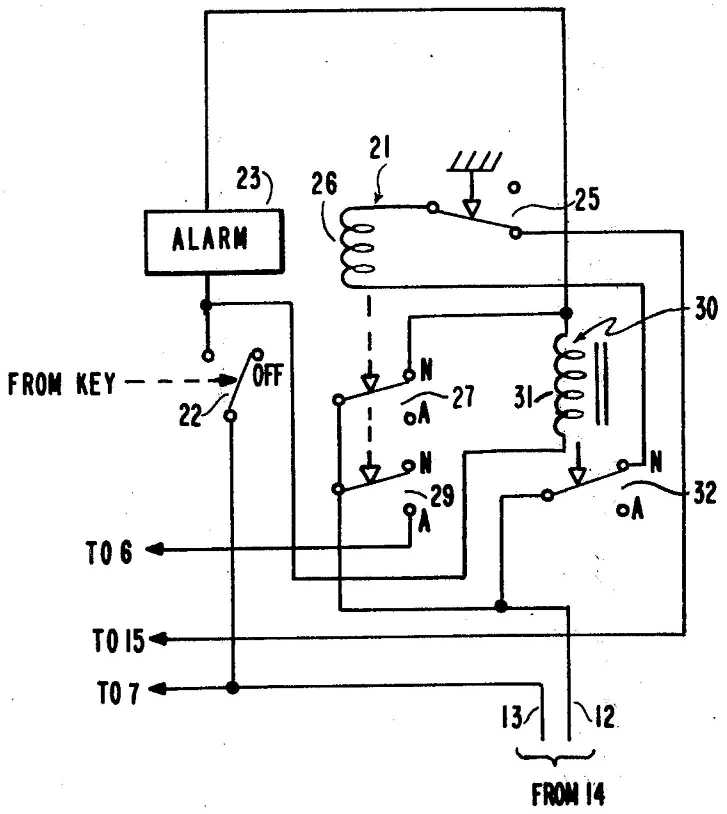
FIG. 3 is an electrical schematic showing another embodiment of the security alarm system including a time delay relay for avoiding a false alarm signal due to short interval loss of AC power.

FIG. 3 shows the electrical schematic of a system very similar to the electrical system shown in FIG. 2. Here, however, the relay 21 is a double pole double throw switch (it has two switches, 27 and 29) and, instead of relay switch 28, a single pole double throw time delay relay 30 is used. This time delay relay includes a coil 31 and switch 32. The two positions of the switch 32 are denoted N for normal and A for actuated. Following energizing coil 31 for a pre-determined period, the time delay switch 32 is switched from the N position to the A position. In this system, when the system is armed with the plug inserted in the receptacle, and then the plug is removed from the receptacle, the required self-latching function of relay 21 in FIG. 1 is provided by the time delay relay 30 which opens the circuit to coil 26. Thus, the system in this embodiment provides no false alarm when AC power fails and comes back on again. The delay period of the time delay relay 30 is a little longer than the attraction time of relay 21. It need not be more than a fraction of a second.

EMBODIMENT IV

Figure 4:
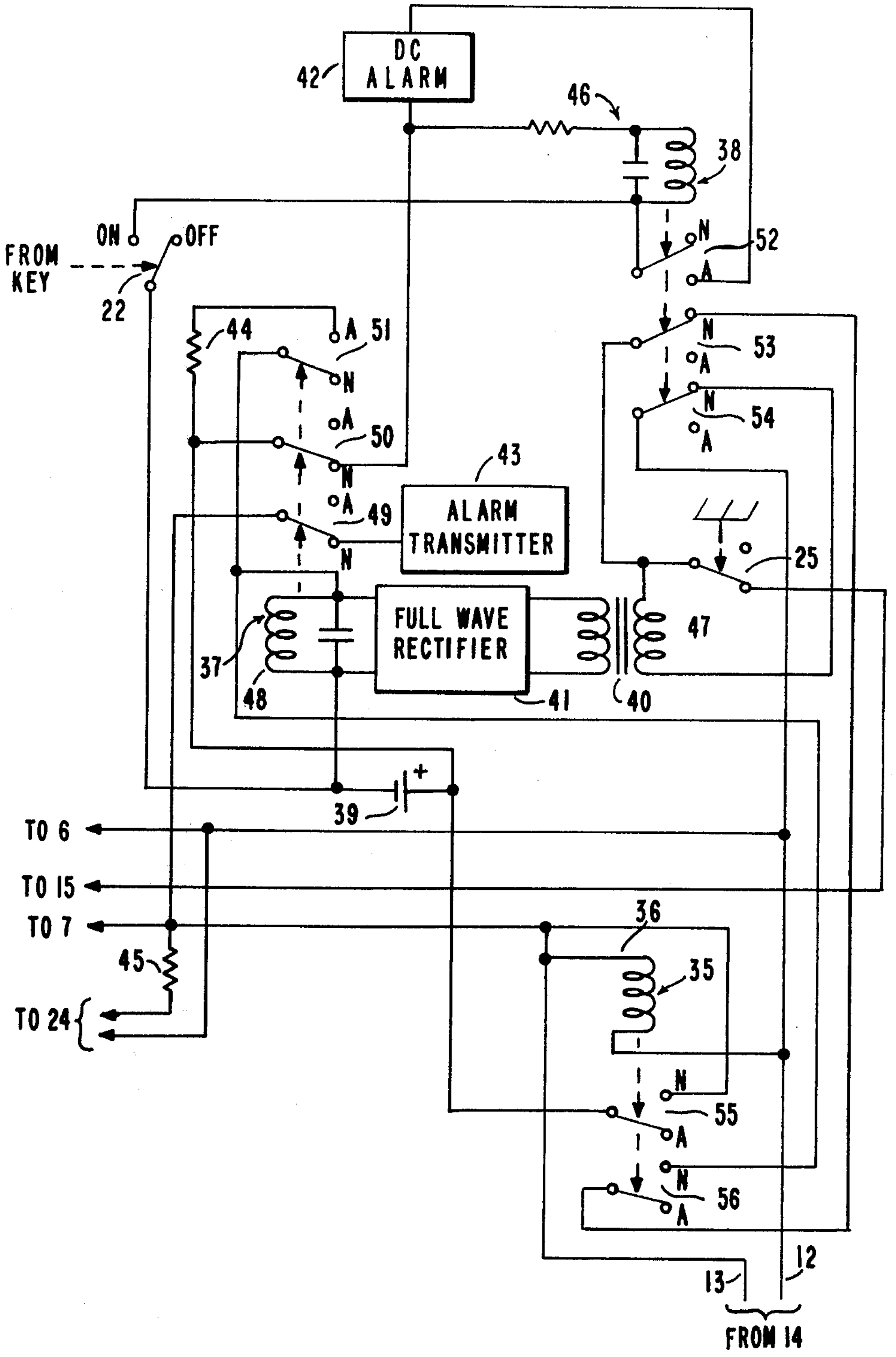
FIG. 4 is an electrical schematic of another embodiment of the invention including a rechargable DC source and circuit to provide operation of this system even for long durations of AC power failure.

This embodiment shown in FIG. 4 operates with either AC or DC current and so provides continual operation even during AC power failure situations. Functionally, this system is similar to the systems shown in FIGS. 1, 2 and 3 and it is operated the same as the systems shown in those figures. In addition, it gives an alarm at the receptacle and transmits an alarm signal that can be detected at a remote location. This performance is achieved even when AC power is interrupted for a relatively long period of time.

The circuit as shown in FIG. 4 consists of a double pole, double throw; AC relay 35 of which the coil 36 is across the input power wires 12 and 13; two triple pole, double throw DC relays 37 and 38; a DC source 39, which may consist of four to eight rechargable 1½ volt dry cell batteries; the microswitch 25, an AC transformer 40; a full wave rectifier 41; key switch 22; a DC alarm device 42, an alarm transmitter 43; current limiting resistor 44; neon light resistor 45; and an RC time delay 46 for DC relay 38. This system has two modes of operation referred to herein as AC mode and the DC mode.

The sequence of operation of the system shown in FIG. 4 is the same as already described above with reference to FIG. 1. The circuit in FIG. 4 normally operates in the AC mode and it senses the presence or absence of AC current and automatically switches to the DC mode whenever AC power is interrupted. So long as AC power is on, the bank of batteries 39 remains fully charged and ready for operation. Under normal conditions when AC line power is on, the circuitry operates in the AC mode and the presence of AC input power is sensed by AC relay 35 and indicated by neon light 24.

In operation, when the appliance plug is inserted into the receptacle, (while the key switch 22 is in the OFF position) and microswitch 25 is closed, AC current flows through the primary coil 47 of transformer 40. This produces a DC current flow through the coil 48 of DC relay 37 causing the ganged switches 49, 50 and 51 of relay 37 to switch from their N positions to their A positions. Then, switch 51 provides DC current flow through the charging resistor 44 to the positive terminal of the batteries 39. Also, switch 50 opens the circuit to DC alarm 42 and switch 49 opens the circuit to alarm transmitter 43 and so no alarm signals are generated. Next, the key switch 22 is turned to the ON position and this sets the system ready to signal an alarm if the plug is removed from the receptacle or if the power line from the plug to the appliance is cut.

When the plug is removed from the receptacle, current flow through the coil 48 of relay 37 is interrupted and the switches 49 to 51 thereof switch to their N positions creating a closed circuit for the DC alarm 42, a closed circuit for the alarm transmitter 43 and an open circuit to the battery charging resistor 44. The time delay 46 to the DC alarm 42 is such that within about a half a second after DC relay 38 is energized the DC alarm 42 sounds and the three ganged switches 52, 53 and 54 actuated by relay 38 are all opened (positioned at their A positions). This interrupts the AC path of the primary winding 47 of transformer 40 and prevents any possible cut off of the alarm by reinserting the appliance plug or by inserting a dummy plug in the receptacle. Thus, in this condition, the alarm can be turned off only by an operator using a key to actuate the key switch 22.

In the event AC power is interrupted, AC relay 36 is not energized and so the switches 55 and 56 of that relay return to their N positions. At the N position, switches 55 and 56 provide a DC current path from the battery 39 through the short circuited terminals 7 and 15 of the receptacle to DC relay 37. And so, the system is then powered by DC and is in the DC mode.

In the DC mode, the system in FIG. 4 operates the same as in the AC mode and the switch 53 of relay 38 provides a self-latching action for this relay enabling the alarm to stay on indefinitely, powered by batteries 39, when the appliance plug is removed and then inserted back into the receptacle.

The function of RC circuit 46 is to prevent latching of the DC relay 38 by providing a proper time delay during automatic mode switching from AC to DC, or vice versa, when the AC power line power is interrupted. Consequently, the occurance of a false alarm is prevented when mode switching takes place.

EMBODIMENT V

Figure 5:
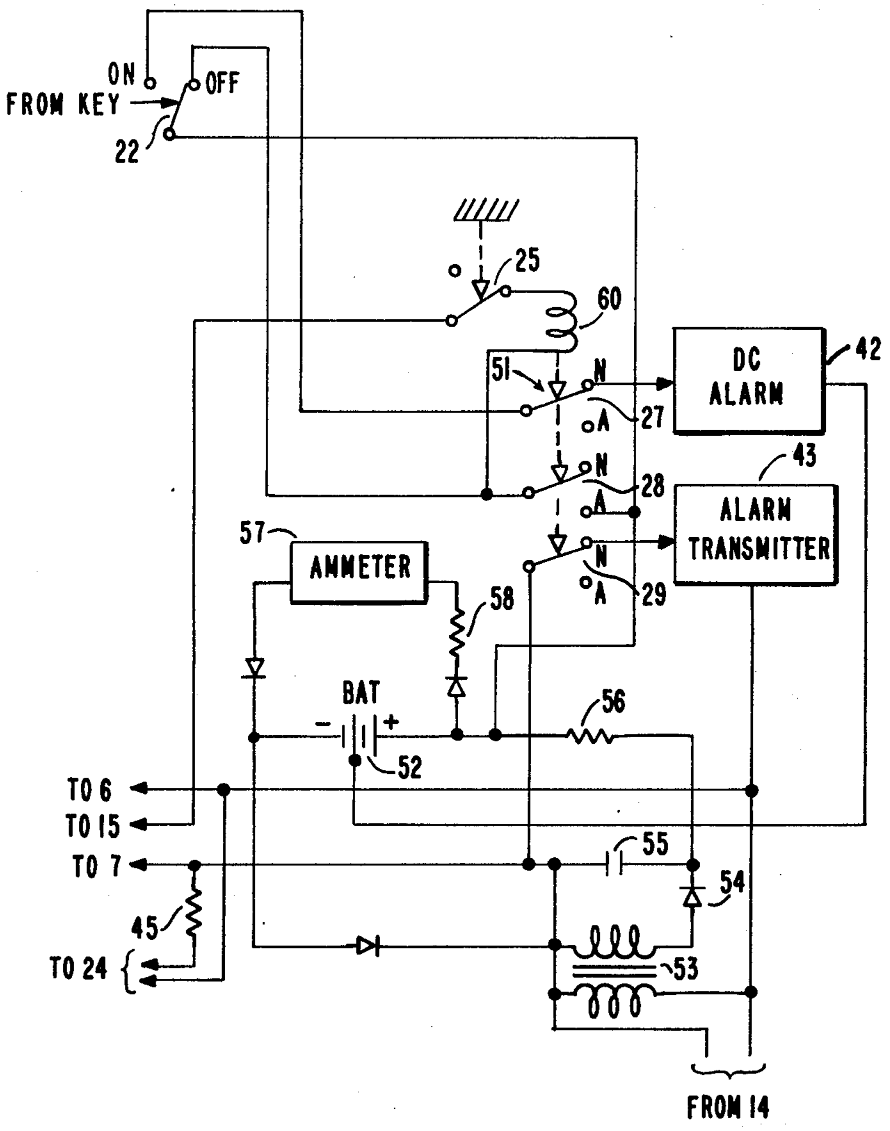
FIG. 5 is an electrical schematic of another embodiment which has the same functional performance as the embodiment shown in FIG. 4, but operates in a DC mode all of the time whether AC line current is present or not.

This embodiment of the security alarm system, represented by the circuit diagram in FIG. 5, operates in a DC mode all of the time whether AC line power is interrupted or not. This circuit consists of a three pole, double throw DC relay 51; a bank of rechargable batteries 52; an AC transformer 53; a rectifier diode 54 and capacitor 55 across the secondary of the transformer; the key switch 22; DC alarm 42, a current limiting resistor 56 to the bank of batteries 52; a neon light resistor 45; and an ammeter 57 in series with a resistor 58, used as a battery performance indicator.

As mentioned above, this circuit operates in the DC mode all the time whether AC line current is interrupted or not. When the AC line power is on, which is indicated by the neon light 24, the transformer 53, through rectifier 54 and the charging resistor 56, charges the bank of batteries 52, so that the batteries constantly supply DC power to the coil 60 of DC relay 51. Thus, this system operates in a continuous manner with an inherent automatic or intrinsic AC to DC switchover capability in the event of AC power interruption. The functional operation of this circuit is substantially the same as the circuit in FIG. 1, with the exception that the alarm device is a DC alarm instead of an AC alarm.

RECEPTACLE ADAPTION

Figure 7:
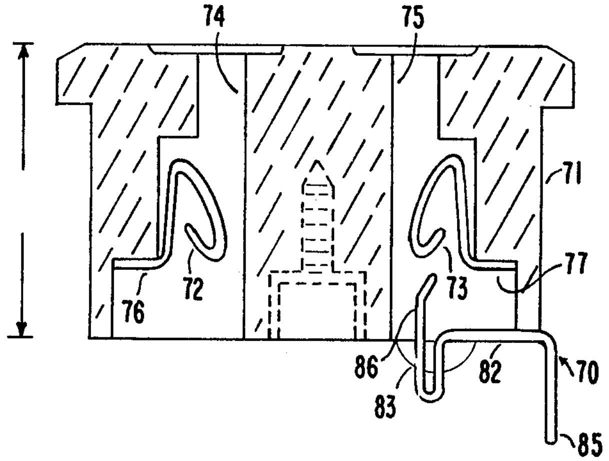

The receptacle 4 illustrated in FIGS. 1 and 2 and used with all of the above described embodiments of the present invention, may be specially designed and constructed for the purposes described herein, or a conventional receptacle may be adapted for all the uses described herein. FIGS. 6 and 7 show two views of a substantially conventional AC power receptacle equipped with a specially made detection terminal 70. This receptacle and detection terminal 70 performs in every respect like the receptacle 4 with detection terminal 15 shown in FIG. 1.

The bottom view in FIG. 6 shows the receptacle dielectric body 71, two electrical contacts 72 and 73 symmetrically spaced in the receptacle to accommodate insertion of the prongs 8 and 9 of the appliance plug 10. For these contacts there are provided holes 74 and 75 through the receptacle body from the top through the bottom, into which the plug prongs are inserted. The receptacle length L is sufficiently short so that the plug prong projects beyond contact 73 at the bottom of the receptacle and against the detection terminal 70 attached at the bottom of the receptacle.

The contacts 72 and 73 attach to conductive pads 76 and 77 which are fixed to the bottom of the receptacle. Screws 78 and 79 threadably engage the pads 76 and 77 and serve to attach the AC power wires 13 and 12 to these pads when the receptacle is installed.

Figure 8:
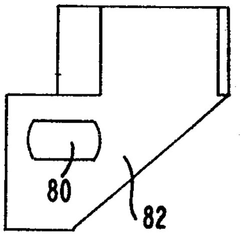
FIGS. 8 and 9 are side and top views of the detection terminal clip attached to the conventional receptacle to provide the detection terminal.
Figure 9:
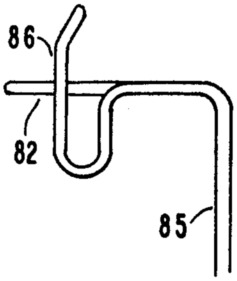
Figure 10:
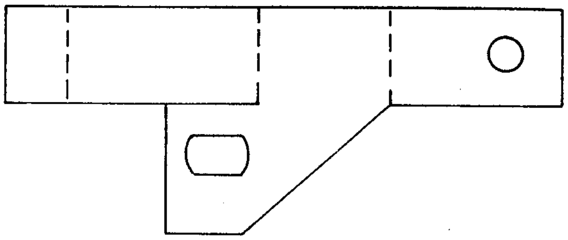
FIGS. 10 and 11 are lay out and isometric views, respectively, of the detection terminal clip to illustrate the structure of the clip and one method for making the clip.
Figure 11:
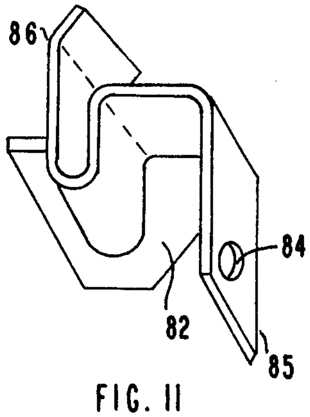

The detection terminal 70 may be made of a single piece of beryllium copper sheet stock which is cut out in the pattern shown in FIG. 10. This cut out is then bent along the broken lines shown in FIG. 10. FIGS. 8 and 9 are top and side views of the detection terminal and FIG. 11 is an isometric view of the terminal. Two holes are provided in the terminal, one hole 80 in the terminal pad 82 accommodates an attaching screw 83 that attaches the terminal to the bottom of the receptacle body. Another hole 84 in the tab portion 85 of this terminal serves for electrical connection to a lead in the detection and alarm circuit. The contact portion 86 of the terminal is folded and may be bent at the free end of the fold to insure positive spring-like contact with the prong that is inserted through receptacle contact 73 and against the contact 86.

CONCLUSION

The general functional requirement of all embodiments of the present invention described herein is that once an appliance plug has been plugged into the receptacle, regardless of whether or not the appliance is turned on, removal of the plug from the receptacle will be instantly sensed and an alarm signal will be provided. This alarm signal may be audible or visual or it may energize a transmitter to transmit an equivalent alarm signal to a remote location. In all embodiments described herein, the alarm cannot be turned off by merely replugging in the same plug or by inserting a dummy plug into the receptacle in an attempt to deceive the security system. Furthermore, all embodiments of the present invention described herein will provide the alarm when the power line from the plug is short circuited as when it is cut by a shearing tool.

The embodiments described herein and the specially adapted receptacle equipped with the detection terminal represent the best known uses of the present invention. These embodiments and the specific descriptions contained herein relating to them are intended to describe the best known uses of the invention and are to be interpreted as illustrative and not in a limiting sense.

What is claimed is:

1. In a power receptacle of an AC power system which includes AC power wires which feed power to one or more such receptacles in parallel, means for interrupting power to a receptacle when that receptacle draws excessive current comprising, an overload switch connecting one of the power wires to the receptacle when said switch is actuated, control means for actuating said switch when the control means draws current, another switch between the power wires and the control means for energizing the control means, said other switch also having an actuated condition and being controlled by said control means, whereby, once said control means draws current, resulting in the actuation of both of said switches, the control means remains energized and power is fed from the power wires to the receptacle, and thereafter when the receptacle draws excessive current, current to the control means decreases so that the control means no longer actuates the switches, whereupon the switches become de-actuated cutting off power to the receptacle and current to the control means.

2. A power receptacle as in claim 1 wherein, the receptacle has a common and a hot terminal and the power wires include a common and a hot wire, the receptacle includes a third terminal which is electrically connected to the receptacle common terminal when the receptacle is mechanically engaged by an electrical load the overload switch connects the receptacle hot terminal to the hot wire and the control means is energized only when the third terminal is connected to the receptacle common terminal, whereby the receptacle terminals are electrically connected to the power wires only when they are mechanically engaged by an electrical load and, furthermore, when that load draws excessive current, the receptacle is electrically disconnected from the power wires.

* * * * *

UNITED STATES PATENT OFFICE
CERTIFICATE OF CORRECTION

Patent No. 4,059,843 Dated November 22, 1977

Inventor(s) Fahir Girismen

It is certified that error appears in the above-identified patent and that said Letters Patent are hereby corrected as shown below:

Column 4, line 67, before "circuit" -- short -- should be inserted.

Signed and Sealed this

*Eleventh* Day of *April 1978*

[SEAL]

*Attest:*

RUTH C. MASON
*Attesting Officer*

LUTRELLE F. PARKER
*Acting Commissioner of Patents and Trademarks*